United States Patent
Kuthuru et al.

(10) Patent No.: US 12,267,463 B2
(45) Date of Patent: Apr. 1, 2025

(54) DOUBLE TALK DETECTORS

(71) Applicant: Hewlett-Packard Development Company, L.P., Spring, TX (US)

(72) Inventors: Srikanth Kuthuru, Palo Alto, CA (US); Sunil Bharitkar, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 27 days.

(21) Appl. No.: 17/919,059

(22) PCT Filed: Apr. 15, 2020

(86) PCT No.: PCT/US2020/028298
§ 371 (c)(1),
(2) Date: Oct. 14, 2022

(87) PCT Pub. No.: WO2021/211113
PCT Pub. Date: Oct. 21, 2021

(65) Prior Publication Data
US 2023/0171346 A1   Jun. 1, 2023

(51) Int. Cl.
*H04M 9/08* (2006.01)
*H04B 3/23* (2006.01)

(52) U.S. Cl.
CPC ............ *H04M 9/082* (2013.01); *H04B 3/234* (2013.01)

(58) Field of Classification Search
CPC ...... H04M 9/082; H04M 1/6008; H04M 9/08; H04B 3/234
See application file for complete search history.

(56) References Cited

U.S. PATENT DOCUMENTS

| | | | |
|---|---|---|---|
| 6,272,106 B1 | 8/2001 | Kawahara et al. | |
| 6,442,273 B1 | 8/2002 | Okuda | |
| 6,804,203 B1 | 10/2004 | Benyassine et al. | |
| 6,947,552 B2 | 9/2005 | Takada | |
| 7,333,605 B1 * | 2/2008 | Zhang | H04M 9/082 379/406.08 |
| 8,014,516 B2 | 9/2011 | Hsu et al. | |
| 8,331,552 B2 | 12/2012 | Tan | |

(Continued)

FOREIGN PATENT DOCUMENTS

JP        2008219088 A   *   9/2008

OTHER PUBLICATIONS

Benesty, J. et al., "A new class of doubletalk detectors based on cross-correlation," IEEE Transactions on Speech and Audio Processing, vol. 8, No. 2, Mar. 2000, pp. 168-172.

*Primary Examiner* — Akelaw Teshale
(74) *Attorney, Agent, or Firm* — Quarles & Brady LLP (57) ABSTRACT

In example implementations, an apparatus is provided. The apparatus includes an adaptive filter and a double talk detector in communication with the adaptive filter. The adaptive filter is to calculate a transfer function with coefficients for a particular time that is applied to an output signal of a microphone to cancel echoes caused by a reference signal in the output signal of the microphone. The double talk detector is to determine a peak of the coefficients, detect double talk based on a location of the peak of the coefficients, and transmit a pause signal to the adaptive filter in response to detection of the double talk, wherein the pause signal is to pause a calculation of updates to the coefficients by the adaptive filter.

18 Claims, 5 Drawing Sheets

(56) References Cited

U.S. PATENT DOCUMENTS

| | | | |
|---|---|---|---|
| 9,191,493 B2 | 11/2015 | Adams | |
| 9,503,569 B1 | 11/2016 | Adams | |
| 9,680,999 B2 | 6/2017 | Jang | |
| 2003/0016815 A1* | 1/2003 | Kurtz | H04B 3/23 |
| | | | 379/406.01 |
| 2004/0037417 A1 | 2/2004 | Seibert | |
| 2004/0086109 A1 | 5/2004 | Takada | |
| 2005/0130711 A1 | 6/2005 | Kang et al. | |
| 2009/0010445 A1* | 1/2009 | Matsuo | H04M 9/082 |
| | | | 381/66 |
| 2009/0168993 A1* | 7/2009 | Yano | H04B 3/234 |
| | | | 379/406.05 |
| 2009/0245502 A1* | 10/2009 | Liu | H04M 9/082 |
| | | | 379/406.08 |
| 2009/0257579 A1* | 10/2009 | Takada | H04B 3/23 |
| | | | 379/406.08 |
| 2012/0237047 A1* | 9/2012 | Neal | H04M 9/082 |
| | | | 381/66 |
| 2016/0006480 A1 | 1/2016 | Tan | |
| 2019/0045066 A1* | 2/2019 | Hera | H04M 3/002 |
| 2019/0104360 A1* | 4/2019 | Bou Daher | H04M 9/082 |
| 2019/0287546 A1* | 9/2019 | Ganeshkumar | G10L 21/0208 |
| 2020/0372891 A1* | 11/2020 | Bou Daher | G10L 21/0232 |
| 2022/0310106 A1* | 9/2022 | Nguyen | G10K 11/17854 |

\* cited by examiner

DOUBLE TALK DETECTORS

BACKGROUND

Conference calls and other types of full-duplex communications can be performed with various remotely located devices. For example, a first user with a device at a far end may communicate with a second user with a device at a near end. The first user may speak into a microphone to transmit audio to a second user that is heard through a speaker at the near end. Conversely, the second user may speak through a microphone to transmit audio to the first user at the far end.

When the second user speaks at the same time as when audio from the first user is outputted by a speaker, the microphone at the near end may detect both audio signals (e.g., the voice of the second user and the audio from the first user emitted by the speaker). The detection of both of these audio signals is known as double talk.

DETAILED DESCRIPTION

Examples described herein provide an apparatus and method to detect double talk. As discussed above, double talk may be detected when both the audio signal of a user speaking into a microphone and an audio signal emitted by a speaker from a far end user are detected by the microphone. Detecting double talk can be used to improve optimization of acoustic echo cancellers (AEC). AECs can be used to mimic the room impulse response and use the room impulse response to predict and cancel out echoes reaching the microphone. The room impulse response is a function that estimates how sound signals reflect off of walls or other objects in a room where a near end user is located.

An adaptive filter in the AEC can perform operations to calculate coefficient values of the room impulse response that are used by the AEC to cancel out echoes. Performing the calculations while double talk is occurring can negatively affect the performance of the adaptive filter. For example, double talk can cause a failure of the calculations by the adaptive filter to converge.

There are various methods to detect double talk. Some methods employ an energy based calculation. An example includes a Geigel Detector. The Geigel Detector may measure a ratio of short term energy levels of the microphone signal and the far-end reference signal. The ratio can be compared against a threshold to detect double talk activity. However, energy based methods may fail at very low near-end to far-end speech energy ratios (NFR) and low signal-to-noise (SNR) ratios. In addition, the energy based methods may not be robust to changes in room conditions.

Another method may include frequency domain cross-correlation based methods. The frequency domain cross-correlation based methods may observe correlations in low frequency domain. Correlations in low frequency bins may be highly susceptible to double talk situations, and, therefore useful for doubletalk detection.

Another method may include time-domain cross-correlations. Time-domain cross-correlations may include two different types of methods, simple cross-correlations and normalized cross-correlations. Both types of cross-correlations may include open-loop and closed-loop cross-correlations. Open-loop calculations may be based on cases where the far-end speaker is active and the sound reaching the microphone is the echo of the loudspeaker signal. Closed-loop calculations may include cases where the cross-correlation between the estimated echo signal and the microphone signal is computed.

The present disclosure provides a method and double talk detection apparatus that is time-domain cross-correlation based. The method and apparatus of the present disclosure may perform double talk detection more quickly and efficiently than other time-domain cross-correlation methods. In an example, the present disclosure may include a peak tracking double talk detector (DTD). The peak tracking DTD may include an open loop version and a fast peak tracking closed-loop version. In an example, the peak tracking DTD may be combined with a hybrid of the open loop and closed loop version of the normalized cross-correlation methods.

The DTD apparatus of the present disclosure can be used with an adaptive filter in an AEC. The DTD apparatus of the present disclosure may improve calculations of the room impulse response associated coefficient values by quickly detecting double talk to pause convergence calculations performed by the adaptive filter during double talk. As a result, the calculations by the adaptive filter may converge more quickly and accurately.

Figure 1:
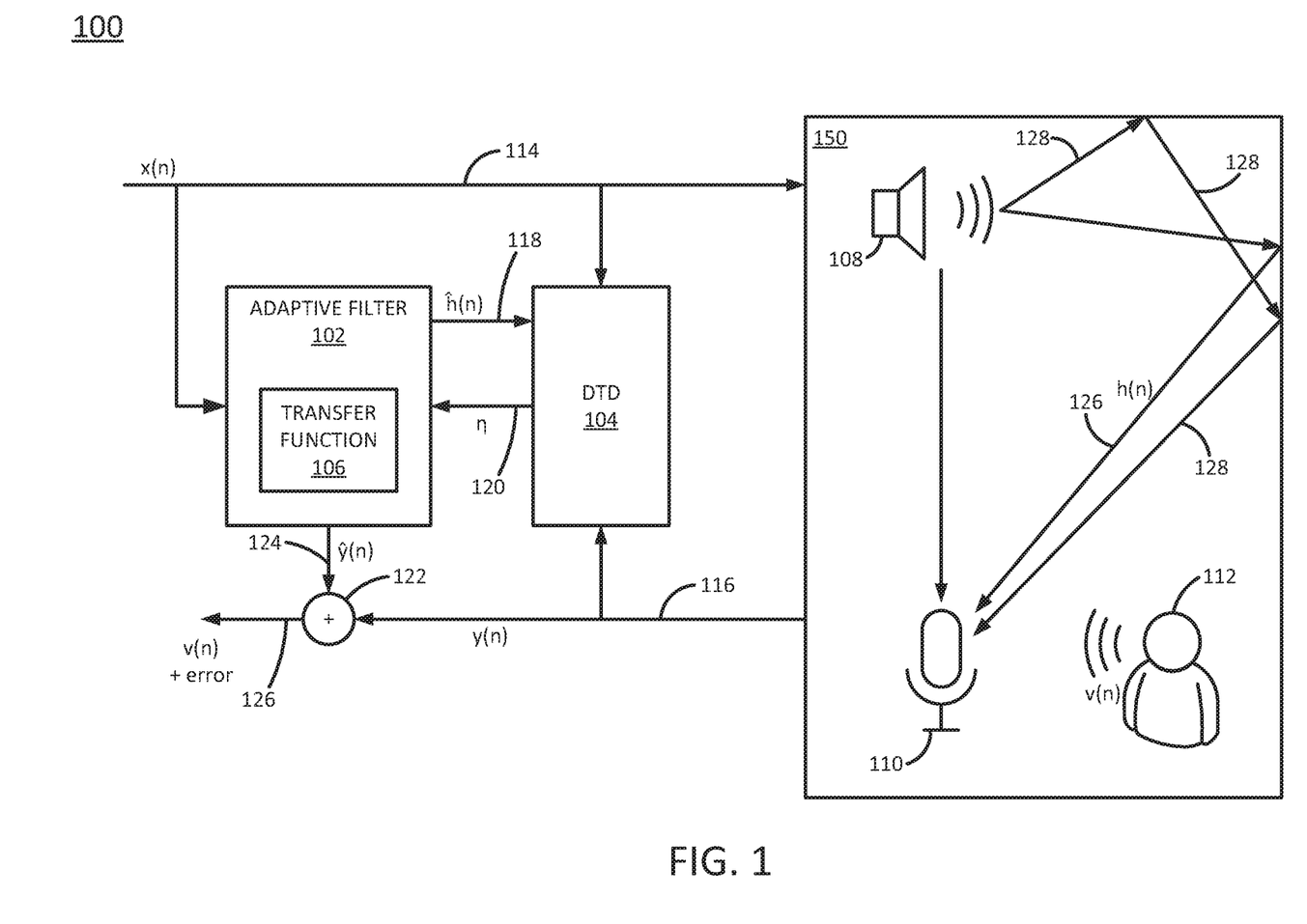
FIG. 1 is a block diagram of an example apparatus to cancel echoes of the present disclosure.

FIG. 1 illustrates an example apparatus 100 to detect double talk and perform echo cancellation. In an example, the apparatus 100 may be an active echo canceller that can be used within an endpoint or be a separate device that can be communicatively coupled to a speaker 108 and a microphone 110 of an endpoint device (e.g., a desktop computer, a laptop computer, a mobile telephone, and the like).

It should be noted that the apparatus 100 has been simplified for ease of explanation. For example, the apparatus 100 may include additional components that are not shown, such as a digital to analog converter, an analog to digital converter, signal boosters, and the like.

In an example, the apparatus 100 may include an adaptive filter 102 and a double talk detector (DTD) 104. The DTD may be communicatively coupled to the adaptive filter 102. In an example, a far end signal or a reference signal 114 (x(n)) may be fed to the adaptive filter 102, the DTD 104 and the speaker 108. The reference signal 114 may be a voice signal from a user who is remotely located from a user 112.

The user 112 may speak (e.g., v(n)) into the microphone 110 to generate an output signal 116 (e.g., y(n)) from the microphone 110. The output signal 116 may be fed to the DTD 104. In an example, the output signal 116 may also include echoes from the reference signal 114 that are emitted by the speaker 108 (e.g., shown by arrows 128).

In an example, the adaptive filter 102 may generate an estimated echo signal 124 (e.g., $\hat{y}(n)$). The estimated echo signal 124 may be a negative value that can be added to the output signal 116 via an adding function 122 to cancel the echoes in the output signal 116. A near end signal+error 126 may be generated (e.g., the output signal 116 less the estimated echo signal 124). The near end signal+error 126 may be transmitted to a speaker (not shown) of the far end user.

In an example, the adaptive filter 102 may generate the estimated echo signal 124 by applying transfer function 106 to the reference signal 114. The transfer function 106 may be a function that can mathematically model the room impulse response (h(n)) at a particular time. The transfer function 106 may include coefficients. The adaptive filter 102 may continuously change the values of the coefficients in small increments until the coefficients are converged to optimal values that minimize the error in the estimated echo signal 124 that is calculated.

The room impulse response may model how sound emitted from the speaker 108 (e.g., shown by the arrow 128) may reflect off of the walls and objects within a location 150 back towards the microphone 110. If the room impulse response can be accurately modeled, then the echoes can be accurately estimated and the echo in the output signal 116 can be accurately removed.

In an example, the adaptive filter 102 may update the coefficients in the transfer function 106 overtime. However, the adaptive filter 102 can perform the updates when there is a reference signal 114 present and the speaker 108 at the near end (e.g., the location 150) is silent (e.g., the signal v(n) is not present). When the user 112 begins speaking, this is identified as double talk.

Double talk can negatively affect the ability of the adaptive filter 102 to converge the coefficients of the transfer function 106 to an optimal solution. For example, in the presence of double talk, the adaptive filter 102 may be unable to converge when updating the coefficients of the transfer function 106. Thus, the DTD 104 can detect when double talk occurs and send a signal 120 to pause the adaptive filter 102. When the DTD 104 no longer detects double talk, the DTD 104 may send the signal 120 to allow the adaptive filter 102 to continue to update the coefficients of the transfer function 106.

In an example, the adaptive filter 102 may share the coefficients (e.g., ĥ(n)) with the DTD 104. The coefficients may be transmitted via a signal 118. The coefficients may be used by the DTD 104 in calculations that are performed to detect when double talk occurs.

Figure 3:
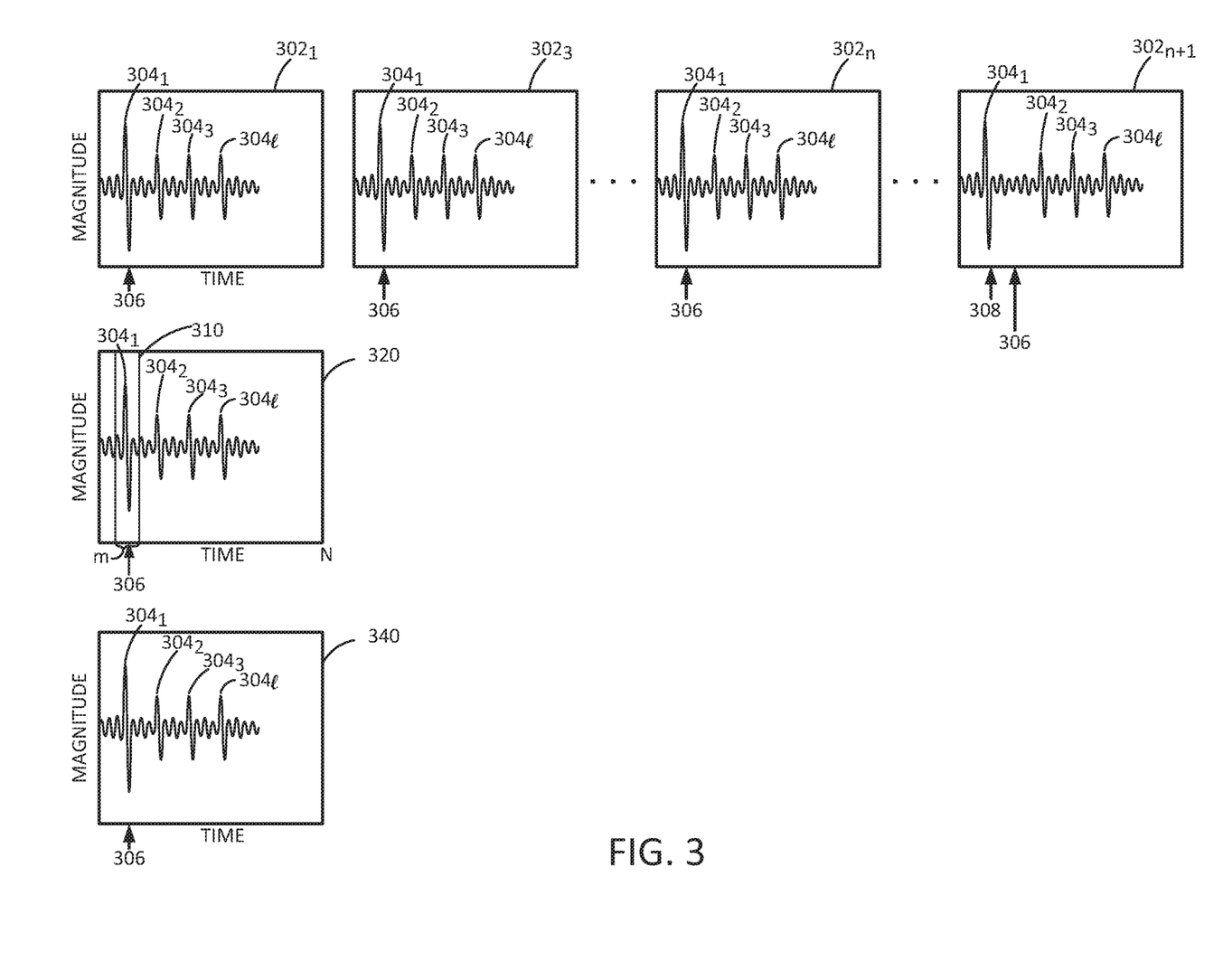
FIG. 3 is an illustration of an example fast cross-correlation analysis performed by the double time detector device of the present disclosure.

In an example, the DTD 104 may detect double talk based on peaks of the coefficients in a room impulse response graph (e.g., examples illustrated in FIG. 3). The DTD 104 may analyze sound signals in a plurality of frames of a pre-determined size (e.g., every 100 seconds, every 500 seconds, every 1000 seconds, and so forth). The DTD 104 may determine peaks of the coefficients in the frames, detect double talk based on a location of the peak of the coefficients in the frames, and then transmit the signal 120 based on whether the double talk is detected. As noted above, the signal 120 may be a pause signal when double talk is detected or a resume signal when the double talk is no longer detected.

Figure 2:
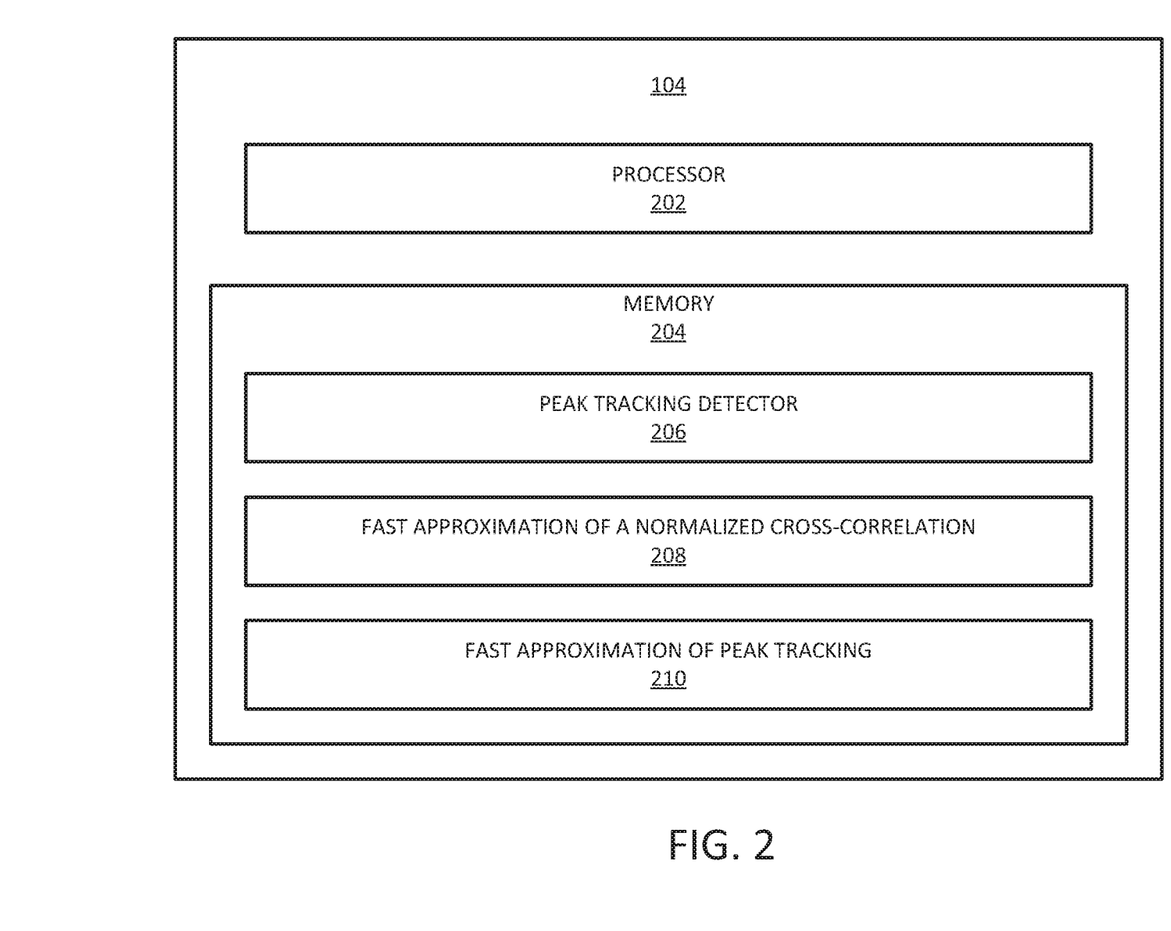
FIG. 2 is a block diagram of example double time detector device of the apparatus of the present disclosure.

FIG. 2 illustrates a more detailed block diagram of the DTD 104. In an example, the DTD 104 may include a processor 202 and a memory 204. The memory 204 may include instructions that are executed by the processor 202.

In an example, the memory 204 may include instructions 206 for a peak tracking detector, instructions 208 for a fast approximation of normalized cross-correlation, and instructions 210 for fast approximation of peak tracking. In an example, the DTD 104 may initially begin by executing the instructions 206 for the peak tracking detector until locations of peaks in the frames are sufficiently converged. For example, the locations of the peaks may be sufficiently converged when the percentage of peaks in the same location is greater than a first threshold (e.g., greater than 90%, greater than 95%, greater than 98%, and so forth).

When the location of the peaks is sufficiently converged, the DTD 104 may execute instructions 208 for the fast approximation of a normalized cross-correlation. The instructions 208 may be executed until the transfer function 106 of the adaptive filter 102 is sufficiently converged, at which time the instructions 210 are executed. For example, the transfer function 106 may be sufficiently converged when the percentage of coefficients that have been optimized is greater than a second threshold (e.g., greater than 90%, greater than 95%, greater than 98%, and so forth).

In an example, based on the instructions 206, 208, or 210, the DTD 104 may output a decision ($\eta$) (e.g., the signal 120) to the adaptive filter 102. In an example, the peak tracking detector in the instructions 206 may perform an open loop version of peak tracking to output a decision $\eta_{ol}$. As shown in Equations (1) through (4) below, under the reference signal 114 and no double talk, $\eta_{ol}$ is equal to the peak value of the normalized room impulse vector.

$$\eta_{ol} = \max c_{xy}^{(1)} = \max \frac{r_{xy}}{\sigma_x \sigma_y} \tag{1}$$

$$= \max \frac{E(xh^T x)}{\sigma_x \sigma_y} = \max \frac{1}{\sigma_x} \frac{E(xx^T h)}{\sqrt{E(h^T xx^T h)}} \tag{2}$$

$$= \max \frac{1}{\sigma_x} \frac{R_{xx} h}{\sqrt{h^T R_{xx} h}} \tag{3}$$

$$= \max \frac{h}{\sqrt{h^T h}}, \tag{4}$$

where $c_{xy}$ is a normalized cross-correlation between the reference signal 114 and the output signal 116, $r_{xy}$ is a cross-correlation vector between the reference signal 114 and the output signal 116, R is a matrix of vectors, $^T$ is a transpose of the vector, E( ) is the expected value, and a represents variance.

It should be noted that $R_{xx} = \sigma_x^2 I$ for the reference signal 114. As can be seen, $\eta_{ol}$ is calculating an infinite norm (max value) of the room impulse response (RIR) and, therefore, the threshold value that is to be chosen for double talk detection may be dependent on the peak value of RIR. So, instead of an $l_\infty$ norm, using an $l_2$ norm would be helpful because $\eta_{ol}$ may be equal to 1 in the absence of double talk and is independent of the room impulse response h. Choosing a threshold in the $l_2$ norm case may be easier. For real world inputs like speech, $R_{xx}$ may be significantly different from a diagonal matrix and, therefore, the decision variable may fluctuate and result in errors.

Next, similar analysis may be performed on the normalized cross-correlation vector $c_{xy}$ and its decision variable $\eta_{ncc}$. Under a no double talk scenario, for any input, the result may be shown in Equation (5) and (6) below:

$$c_{xy}^{(2)} = E\left(R_{xx}^{-\frac{1}{2}} x \frac{x}{\sigma_y}\right) \tag{5}$$

$$= \frac{R_{xx}^{\frac{1}{2}} h}{\sqrt{h^T R_{xx} h}} \tag{6}$$

The decision variable $\eta_{ncc}$ is equal to the $l_2$ norm of $c_{xy}$. It can be observed that, irrespective of the input, in $\eta_{ncc}$ will be equal to 1 under no double talk situations. In the peak tracking detector in the instructions 206, instead of using the norm of cross-correlation vectors as shown above, the peak tracking detector may track a position of the peak/highest magnitude in a frame.

Cholesky Whitening ($R_{xx}^{-1}$) may be used to calculate the normalized cross-correlation vector, as shown in Equation (5) above.

By using Cholesky Whitening, the resulting cross-correlation vector may be linearly proportional to the true room impulse response, as shown below by Equations (7)-(10). Under a no double talk scenario and quasi-stationary input, the cross-correlation vector can be shown as:

$$c_{xy}^{(3)} = E\left(R_{xx}^{-1} x \frac{y}{\sigma_y}\right) \tag{7}$$

$$= \frac{E(R_{xx}^{-1} xx^T h)}{\sqrt{h^T R_{xx} h}} \tag{8}$$

$$= \frac{R_{xx}^{-1} R_{xx} h}{\sqrt{h^T R_{xx} h}} \tag{9}$$

$$= \frac{h}{\sqrt{h^T R_{xx} h}} \tag{10}$$

So under no double talk, quasi-stationay input and quai-stationary room conditions, $c_{xy}^{(3)}$ may be linearly proportional to the true room impulse response. So the position of the peak may be the same in both $c_{xy}^{(3)}$ and h. Therefore, if the peak position of $c_{xy}^{(3)}$ is consistent across frames, there is no double talk detected. During double talk, the position (used in the instructions 206) or value (used in instructions 208 and 210) of the peak or peaks $c_{xy}^{(3)}$ may get disrupted, and the peak value may fluctuate randomly. Thus, when the peak position or the value at a particular position deviates from a normal (or consistent value), then the double talk may be detected. In an example, the deviation may be greater than a threshold (e.g., more than a desired amount or position from the normal or consistent position or more than an expected value/magnitude threshold) The double talk decision value based on peak tracking described above may be represented as $\eta_{pt}$.

FIG. 3 illustrates an example of the peak tracking detector described above. For example, a plurality of frames $302_1$ to $302_n$ (hereinafter also referred to individually as a frame 302 or collectively as frames 302) may be analyzed. Each frame 302 may have a pre-determined size and represent a magnitude of the peaks of the coefficients in the room impulse response that may be linearly correlated to the cross-correlation of the reference signal 114 and the output signal 116, as described above.

In an example, each frame 302 may include peaks $304_1$ to $304_f$ (hereinafter also referred to individually as a peak 304 or collectively as peaks 304). The present example is shown by tracking a single peak 304. However, the peak tracking detector may also track the top P peaks (e.g., a plurality of peaks 304).

In an example, the open loop cross-correlation calculations performed above in Equations (1)-(10) may be used to identify a location of the peaks 304. In an example, the peak with the highest or largest magnitude may be tracked (e.g., the peak $304_1$) across frames $302_1$ to $302_n$. Calculations may converge onto a location 306 (e.g., a particular time within the frame 302) where the largest peak $304_1$ should be located.

In a subsequent frame $302_{n+1}$ (or any other frame 302 between $302_1$ and $302n$) the largest peak $304_1$ may be located at a position 308 that is different than the position 306 where the largest peak $304_1$ is expected to be located. If the difference between the positions 308 and 306 is greater than a threshold, the positions 308 and 306 may be determined to be different, and double talk may be detected. For example, the threshold may be greater than 5%, greater than 10%, and the like. In response, the DTD 104 may transmit a pause signal via the signal 120 to the adaptive filter 102. As noted above, in other examples, the top P peaks may be tracked. Thus, if the location of any one of the top P peaks changes in a frame 302, then double talk may be detected.

As noted above, after the locations of the peaks 304 are sufficiently converged, the DTD 104 may perform the instructions 208 to perform the fast approximation of a normalized cross-correlation. The fast approximation of a normalized cross-correlation may improve the speed of peak tracking detector executed by the instructions 206. The fast approximation of a normalized cross-correlation may be a hybrid of an open loop and closed loop normalized cross-correlation calculation.

The normalized cross correlation vector $c_{xy}^{(2)}$ is given by Equation (5). Here, the size of the reference frame x is equal to the filter length N and the size of the covariance matrix $R_{xx}$ is N×N. Instead of using the entire reference vector x, a small part of the reference vector is used called $x^0$. The peak location of the estimated filter coefficients is first calculated, and then the corresponding location of the reference vector is used to choose the subvector. For example, if the $p^{th}$ location of the filter coefficients has the highest magnitude, then choose a subframe (or subvector) of length 'k' around the $p^{th}$ location of the reference vector. That means, at any instant, reference signal samples are being looked for that are part of the main echo at the microphone.

For example, in the room impulse response (actually the estimated filter coefficients), analysis can be performed in a section of the coefficients around the filter peak, and then cross correlations of the corresponding subvector $x^0$ can be computed. Similarly, the sub-matrix $R_x 0_x 0$ can be calculated, which corresponds to the covariance of the subvector. This subvector and submatrix can be used to calculate the FastNCC vector. The final decision variable becomes the following as shown in Equation (11) below.

$$\eta_{ncc}' = \|c_{xy}'^{(2)}\|_2 = r_{x'y}^T (\sigma_y^2 R_{x'x'})^{-1} r_{x'y} \tag{11}$$

The length of the subvector is user-defined, and the value of k may be selected to be between 50 to 200 to provide computational benefits. The computational benefit is obtained because a smaller matrix inversion kxk is performed compared to larger matrix inversions N×N where N ranges from 512 to 8192 and more.

FIG. 3 illustrates an example of the fast approximation of a normalized cross-correlation described above in a frame 320. A location 310 of a maximum peak $304_1$ may be determined using the peak tracking detector described above. Rather than analyzing an entire length of the frame from 1 to N, as done in the peak tracking detector, a window 310 having a length m may be selected, where m is less than N. The window 310 may be selected around a location 306 where the peak $304_1$ is expected to be located. Thus, the amount of computation and analysis is reduced to windows 310 of a length m rather than entire frames 320 of a length N. The window 310 may be applied for each subsequent frame 320.

A value or magnitude of the peak $304_1$ at the location 306 may be determined. The value of the magnitude of the peak $304_1$ may be compared to an expected value threshold. For example, based on the convergence of the location of the peaks 304 in the instructions, an expected value of the peak 304 may be calculated. In an example, the expected value may be an average of the values of the peaks 304 at the location 306. If the magnitude or value of the peak $304_1$ detected at the location 306 within the window 310 is greater than the expected value threshold, then double talk may be detected.

As the adaptive filter 102 continues to converge the coefficients of the transfer function 106, the DTD 104 may change to implementing the instructions 210. As noted above, when the transfer function 106 is sufficiently converged, the DTD 104 may execute the instructions 210 for the fast approximation of peak tracking.

In the peak tracking detector in the instructions 206, described above, the cross-correlation vector $c_{xy}^{(3)}$ may be calculated. This calculation uses an inversion of the covariance matrix $R_{xx}$, which may be computationally intensive. As shown in Equations (7)-(10) the cross-correlation vector $c_{xy}^{(3)}$ may be linearly proportional to h under some assumptions described above. As a result, in the fast approximation of peak tracking, the locations of the top peak or peaks in $c_{xy}^{(3)}$ or h may be approximated with locations of the top few peaks in h.

It should be noted that the peak locations information from unconverged adaptive filter coefficients can be used. This still works because the adaptive filter 102 can learn the locations of high magnitude filter coefficients significantly earlier than the filter convergence. This may be shown with the reference signal 114 and experimental results on speech data.

Consider a Least Mean Squares (LMS) filter with a learning rate y and initial filter coefficients set to zero, and a reference signal 114 with a covariance matrix $R_{xx}=\sigma_x^2 I$. Then, it can be shown that the filter coefficients at any instant during the learning process are directly proportional to the true room impulse response. This statement is proved below, assuming quasi stationary room conditions by Equations (12)-(16) below:

$$\hat{h}[n+1] = \hat{h}[n] + \mu E(x[n]e[n]) \quad (12)$$

$$= \hat{h}[n] + \mu E\left(x[n](h-\hat{h}[n])^T x[n]\right) \quad (13)$$

$$= \hat{h}[n] + \mu E(x[n]x[n]^T(h-\hat{h}[n])) \quad (14)$$

$$= \hat{h}[n] + \mu R_{xx}(h-\hat{h}[n]) \quad (15)$$

$$= (1-\mu\sigma_x^2)\hat{h}[n] + \mu\sigma_x^2 h \quad (16)$$

In the above equations, if $\hat{h}[0]=0$ is replaced, then the filter coefficients at any instant during the learning process are directly proportional to the true room impulse response h. So, the locations of peaks can be detected significantly earlier compared to the filter convergence. This can be observed from practical simulations on speech data.

FIG. 3 illustrates an example frame 340 that illustrates the fast approximation of peak tracking described above. As noted above, rather than analyzing an entire length of the frame 302, or a window 310, the fast approximation of peak tracking described above may go directly to the location 306 where the peak $304_1$ is expected to be located. The magnitude value at this location may be compared across the frames 340. If the values or magnitudes are the same, then no double talk is detected. If a different value is detected in any of the frames 340, then double talk may be detected.

Figure 4:
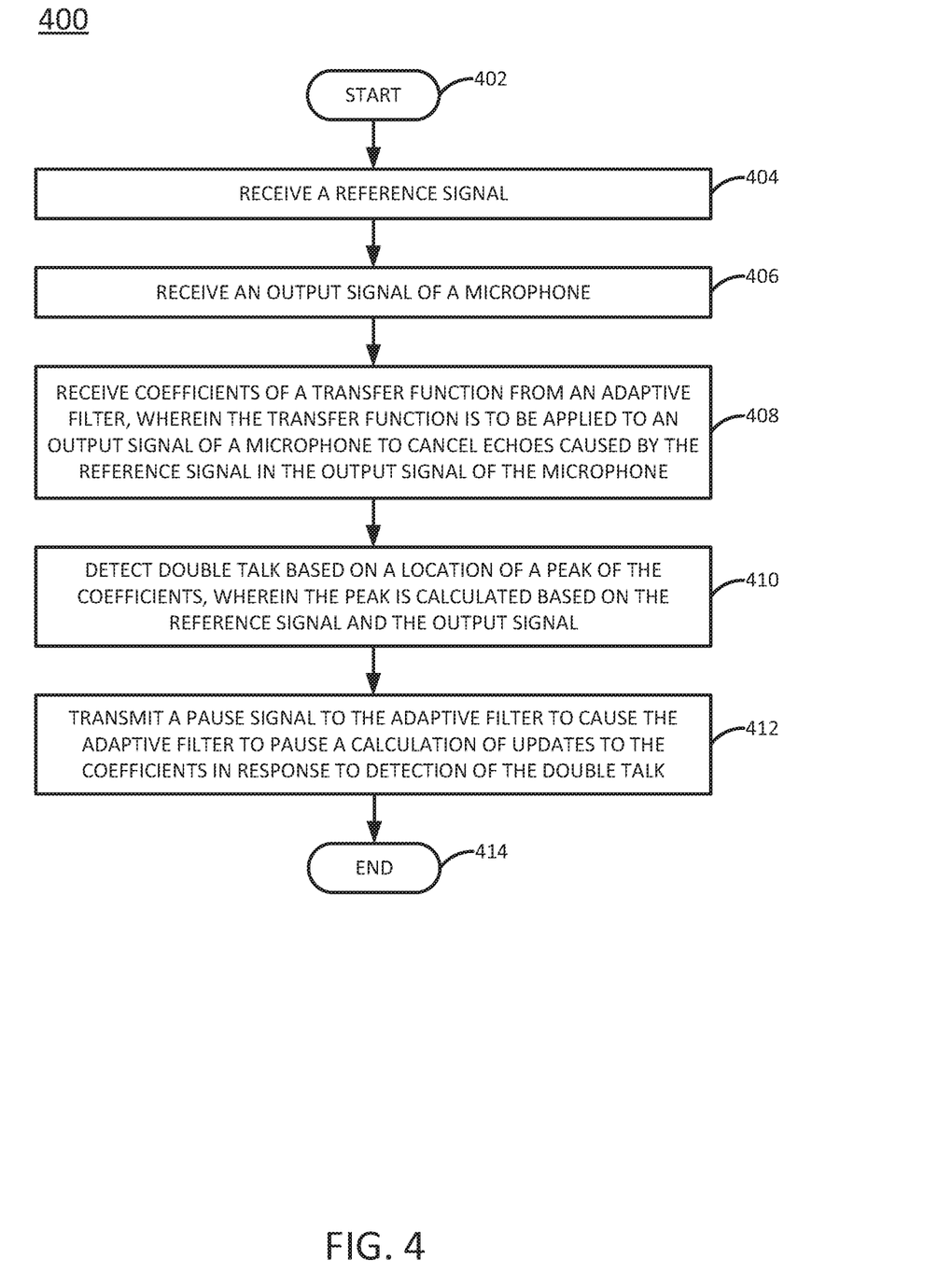
FIG. 4 is a flow diagram of an example method for detecting double talk.

FIG. 4 illustrates a flow diagram of an example method 400 for detecting double talk of the present disclosure. In an example, the method 400 may be performed by the apparatus 100 or the apparatus 500 illustrated in FIG. 5, and described below.

At block 402, the method 400 begins. At block 404, the method 400 receives a reference signal. The reference signal may be a far end signal from a first user. The first user may be remotely located from a second user who is located in a room or location with a speaker and a microphone.

At block 406, the method 400 receives an output signal of a microphone. The output signal of the microphone may include a near end signal (e.g., a sound or speech from the second user at the location) that may include echoes of the reference signal.

At block 408, the method 400 receives coefficients of a transfer function from an adaptive filter, wherein the transfer function is to be applied to an output signal of a microphone to cancel echoes caused by the reference signal in the output signal of the microphone. The coefficients may be used by the DTD to detect double talk. For example, based on an assumption that the cross-correlation of the reference signal and the output signal has a proportionally linear relationship with a room impulse response, the coefficients can be used by the DTD to help identify locations of peaks in the room impulse response.

At block 410, the method 400 detects double talk based on a location of a peak of the coefficients, wherein the peak is calculated based on the reference signal and the output signal. In an example, the location of the peak can be tracked using an open loop based peak tracking detector described above (e.g., instructions 206 of the DTD 104). Once the location of the peaks is converged to a known location, the magnitudes of the peaks at the expected location can be used to detect double talk using a fast approximation of a normalized cross-correlation (e.g., instructions 208 of the DTD 104) or a fast approximation of peak tracking (e.g., instructions 210 of the DTD 104).

As described above, the peak tracking detector can calculate a time-domain cross-correlation between the reference signal and the output signal for a plurality of frames. A location with the peak in the plurality of frames can be identified. Then each one of the plurality of frames can be compared to determine if the location of the peak is different in any one of the plurality of frames. In some examples, more than one peak may be tracked to detect double talk.

The fast approximation of a normalized cross-correlation may select a reference vector that has a length that is less than a length of the frame. For example, if the frame has a length N, then the reference vector may have a length k, where k is less than N. The location of the peak may be identified within the reference vector of each one of the plurality of frames. Then, the value or magnitude of the peak at an expected location within the reference vector within each one of the plurality of frames may be compared to a threshold. If a value or a magnitude of the peak is greater than a threshold, then double talk may be detected.

The fast approximation of peak tracking may determine a value of the peak at a pre-determined location for the plurality of frames. The value in each one of the plurality of frames may be compared to determine if the value is different in any one of the plurality of frames. If a different value is found, then double talk may be detected.

At block 412, the method 400 transmits a pause signal to the adaptive filter to cause the adaptive filter to pause a calculation of updates to the coefficients in response to detection of the double talk. The pause signal may pause the adaptive filter until double talk is no longer detected. When double talk is no longer detected, the DTD may transmit a resume signal to allow the adaptive filter to continue to perform calculations to update the coefficients of the transfer function to an optimal value. At block 414, the method 400 ends.

Figure 5:
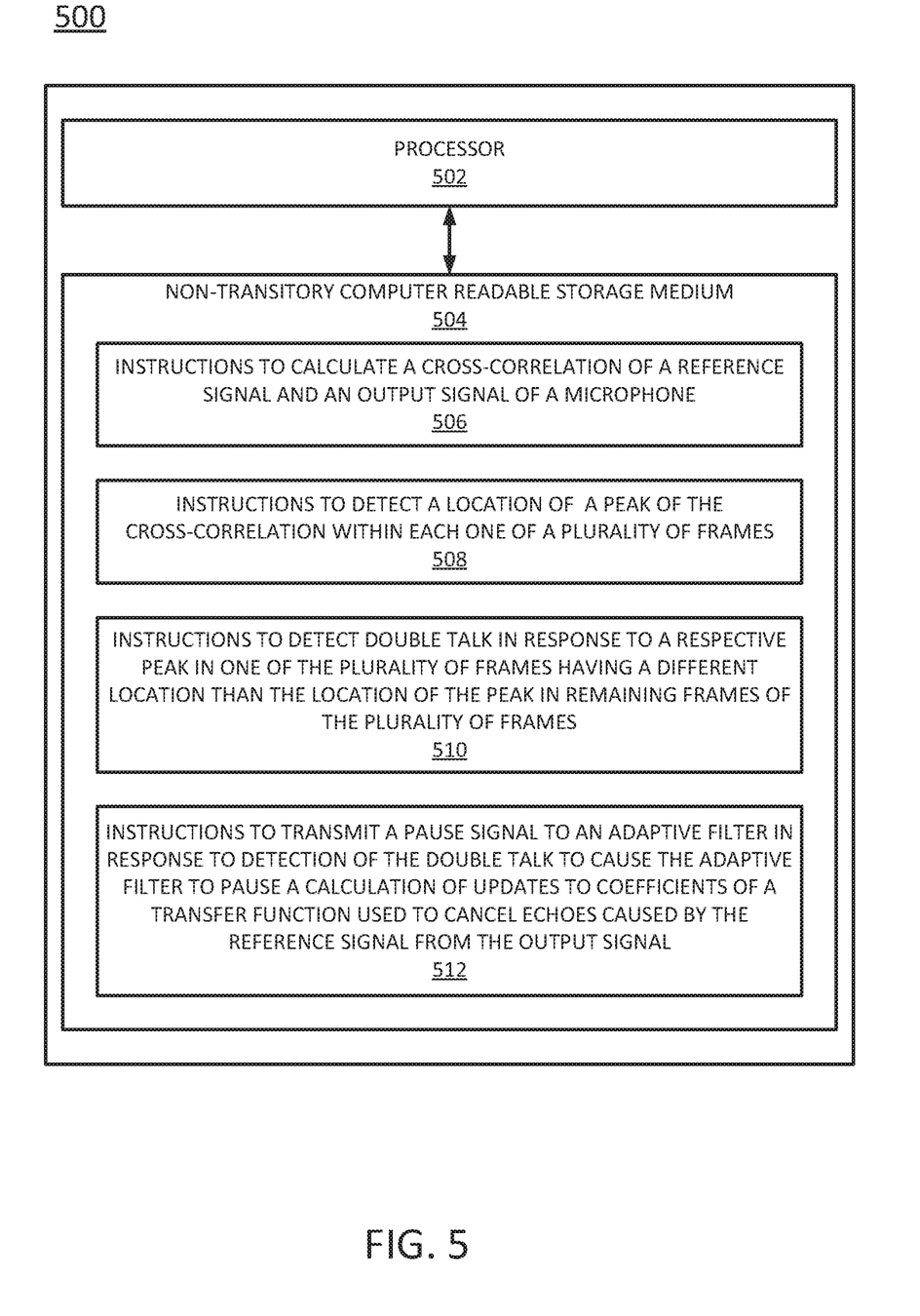
FIG. 5 is an example non-transitory computer readable storage medium storing instructions executed by a processor to detect double talk of the present disclosure.

FIG. 5 illustrates an example of an apparatus 500. In an example, the apparatus 500 may be the apparatus 100. In an example, the apparatus 600 may include a processor 502 and a non-transitory computer readable storage medium 504. The non-transitory computer readable storage medium 604 may include instructions 506, 508, 510, and 512 that, when executed by the processor 502, cause the processor 502 to perform various functions.

In an example, the instructions 506 may include instructions to calculate a cross-correlation of a reference signal and an output signal of a microphone. The instructions 508 may include instructions to detect a location of a peak of the cross-correlation within each one of a plurality of frames. The instructions 510 may include instructions to detect double talk in response to a respective peak in one of the plurality of frames having a different location than the location of the peak in remaining frames of the plurality of frames. The instructions 512 may include instructions to transmit a pause signal to an adaptive filter in response to detection of the double talk to cause the adaptive filter to pause a calculation of updates to coefficients of a transfer function used to cancel echoes caused by the reference signal from the output signal.

It will be appreciated that variants of the above-disclosed and other features and functions, or alternatives thereof, may be combined into many other different systems or applications. Various presently unforeseen or unanticipated alternatives, modifications, or variations therein may be subsequently made by those skilled in the art which are also intended to be encompassed by the following claims.

The invention claimed is:

1. An apparatus, comprising:
an adaptive filter to calculate a transfer function with coefficients for a particular time that is applied to an output signal of a microphone to cancel echoes caused by a reference signal in the output signal of the microphone; and
a double talk detector in communication with the adaptive filter, wherein the double talk detector is to:
determine a peak of the coefficients;
detect double talk based on a location of the peak of the coefficients; and
transmit a pause signal to the adaptive filter in response to detection of the double talk, wherein the pause signal is to pause a calculation of updates to the coefficients by the adaptive filter.

2. The apparatus of claim 1, further comprising:
a speaker to emit the reference signal.

3. The apparatus of claim 1, wherein the peak is calculated based on a cross-correlation between the reference signal and the output signal of the microphone at a particular time.

4. The apparatus of claim 1, wherein the double talk is detected based on the peak when a change in the location of the peak is greater than a difference threshold from an average location of the peak across a plurality of frames of the output signal.

5. The apparatus of claim 1, wherein the double talk is detected based on the peak when the peak is found within a reference vector that is smaller than a length of a frame of the output signal and a value of the peak is greater than an expected value threshold.

6. The apparatus of claim 1, wherein the double talk is detected based on the peak when a change in the location of the peak found at a pre-determined location within a frame of the output signal is greater than a difference threshold of an average location of the peak across a plurality of frames.

7. The apparatus of claim 1, wherein the double talk detector is to:
detect, within each one of a plurality of frames of the output signal, the location of the peak of the coefficients.

8. The apparatus of claim 1, wherein the double talk detector is to:
transmit, to the adaptive filter in response to an absence of the detection of the double talk, a resume signal that causes the adaptive filter to perform the calculation of updates to the coefficients.

9. A method, comprising:
receiving a reference signal;
receiving an output signal of a microphone;
receiving coefficients of a transfer function from an adaptive filter, wherein the transfer function is to be applied to the output signal of a microphone to cancel echoes caused by the reference signal in the output signal of the microphone;
detecting double talk based on a location of a peak of the coefficients, wherein the peak is calculated based on the reference signal and the output signal; and
transmitting a pause signal to the adaptive filter to cause the adaptive filter to pause a calculation of updates to the coefficients in response to detection of the double talk.

10. The method of claim 9, wherein the detecting comprises:
calculating a time-domain cross-correlation between the reference signal and the output signal for a plurality of frames of the output signal;
identifying a location with the peak in the plurality of frames;
comparing each one of the plurality of frames to determine if the location of the peak is different in any one of the plurality of frames.

11. The method of claim 10, wherein peak comprises a plurality of peaks, and
the detecting is performed for each one of the plurality of peaks.

12. The method of claim 10, wherein after the location of the peak within the plurality of frames is converged to greater than a first convergence threshold, the detecting further comprises:
selecting a reference vector that has a length that is less than a length of a frame of the plurality of frames;
identifying a location of the peak within the reference vector of each one of the plurality of frames; and
comparing a magnitude the peak within each one of the plurality of frames to an expected value threshold.

13. The method of claim 12, wherein after the transfer function of the adaptive filter is converged above a second convergence threshold, the detecting further comprises:

determining a value of the peak at a pre-determined location for the plurality of frames;

comparing the value in each one of the plurality of frames to determine if the value is different in any one of the plurality of frames.

14. A non-transitory computer readable storage medium encoded with instructions executable by a processor, the non-transitory computer-readable storage medium comprising:

instructions to calculate a cross-correlation of a reference signal and an output signal of a microphone;

instructions to detect a location of a peak of the cross-correlation within each one of a plurality of frames of the output signal;

instructions to detect double talk in response to a respective peak in one of the plurality of frames having a different location than the location of the peak in remaining frames of the plurality of frames; and instructions to transmit a pause signal to an adaptive filter in response to detection of the double talk to cause the adaptive filter to pause a calculation of updates to coefficients of a transfer function used to cancel echoes caused by the reference signal from the output signal.

15. The non-transitory computer readable storage medium of claim 14, wherein the instructions to detect further comprise:

instructions to track a plurality of peaks in the plurality frames and to detect the double talk when any one of the plurality of peaks has a different location.

16. The non-transitory computer readable storage medium of claim 14, further comprising:

instructions to apply a fast normalized cross-correlation method after the location of the peak within the plurality of frames is converged to greater than a first convergence threshold.

17. The non-transitory computer readable storage medium of claim 16, further comprising:

instructions to apply a fast approximation of peak tracking method after the transfer function of the adaptive filter is converged above a second convergence threshold.

18. The non-transitory computer readable storage medium of claim 14, further comprising:

instructions to transmit, to the adaptive filter in response to an absence of the detection of the double talk, a resume signal that causes the adaptive filter to perform the calculation of updates to the coefficients.

* * * * *